D. Clark,
Piston Packing.
N°49,379. Patented Aug. 15, 1865.
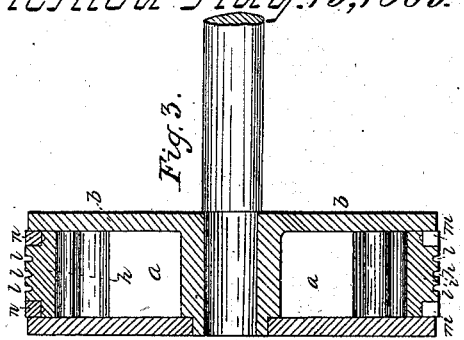
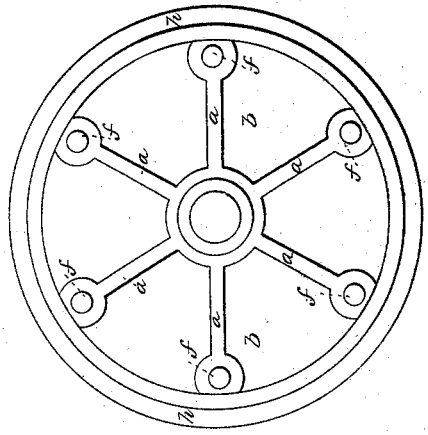
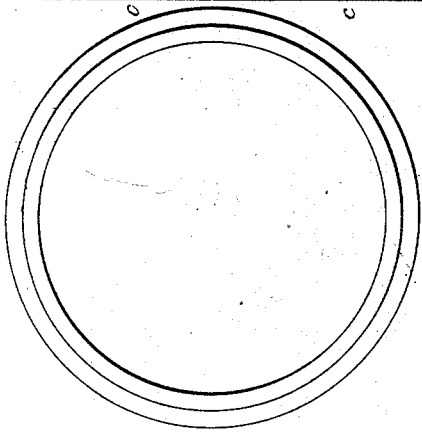
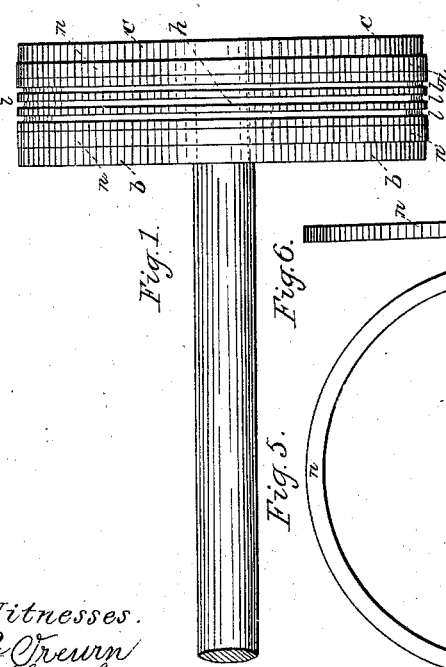
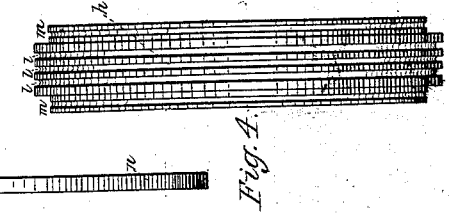
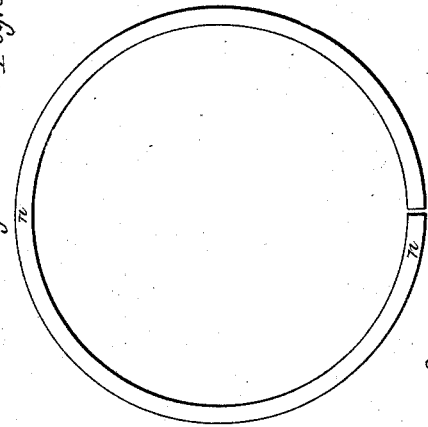
Witnesses.
Inventor.

UNITED STATES PATENT OFFICE.

DAVID CLARK, OF HAZLETON, PENNSYLVANIA.

IMPROVEMENT IN PISTON-PACKING.

Specification forming part of Letters Patent No. 49,379, dated August 15, 1865.

*To all whom it may concern:*

Be it known that I, DAVID CLARK, of Hazleton, in the county of Luzerne and State of Pennsylvania, have invented a new and useful Improvement in Piston-Packing; and I do hereby declare that the following is a full, clear, and exact description thereof, which will enable those skilled in the art to make and use the same, reference being had to the accompanying drawings, forming part of this specification, in which—

Figure 1 is a side view of the piston and its rod; Fig. 2, an end view of the piston, with one of the head-plates removed, showing its interior; Fig. 3, a transverse section of the piston-head; Fig. 4, an edge view of the central portion of the piston detached from its head-plates; Figs. 5, 6, and 7, detail views of parts of the piston.

Similar letters of reference indicate like parts.

The present invention consists in forming in and extending entirely around the periphery of the piston a series of parallel grooves or channels, in combination with one or more expansible split metallic rings placed upon each end portion of the piston-periphery, and so arranged that steam can enter between them and the main portion of the piston, whereby they are caused to be thrown out or expanded, as it were, sufficiently for the piston to fit its cylinder with the requisite tightness to insure its operation, the series of grooves serving as so many channels or receptacles for the water from the condensed steam penetrating thereto when steam is first admitted to the cylinder, whereby the sides of the cylinder are always kept moistened and lubricated, thus preventing the piston from cutting the cylinder.

*a a* in the drawings represent the frame or spider of a piston attached to or forming a part of one, *b*, of its head-plates, *b* and *c*, made of a little less diameter than the bore of the cylinder in which it is to play, between which head-plates and fitting over and upon the outer ends, *f f*, of the arms of the spider-frame is tightly held and secured, by means of a series of screw-bolts and nuts, or in any other proper manner, the solid ring *h*, constituting the periphery or edge of the piston.

Around the central portion of the exterior surface of the said ring *h* are a series of similar parallel grooves or channels, *l l l l*, and outside of same, but at each edge of the ring, is made a larger groove, *m*, in which loosely fits a split metallic packing-ring, *n*, made of such size that as the piston moves forward and backward in its cylinder the steam shall be allowed to work under the rings and between them and the main portion of the piston, thus throwing or expanding them outward sufficiently to have the piston fit the cylinder with the necessary tightness to prevent any leakage of steam therein, the series of parallel grooves *l l*, formed in the central portion of the piston's periphery, as described, serving as so many receptacles, as it were, for water from the condensed steam of the cylinder, whereby the sides of the cylinder are continually kept lubricated and sufficiently moistened to prevent any possibility of the piston cutting or otherwise injuring the same as it plays back and forth.

Packing may be used in the water-grooves *l l*; but I do not deem it necessary.

Having thus described my invention, I claim as new and desire to secure by Letters Patent—

The improvement in piston-packing herein described, the same consisting in forming in and extending entirely around the periphery of the piston a series of one or more grooves or channels, in combination with one or more expansible metallic rings upon each end portion of the said periphery, arranged and operating substantially as and for the purposes specified.

The above specification of my invention signed by me this 31st day of May, 1865.

DAVID CLARK.

Witnesses:
M. M. LIVINGSTON,
C. L. TOPLIFF.